US007211614B2

(12) United States Patent
Bessede

(10) Patent No.: US 7,211,614 B2
(45) Date of Patent: May 1, 2007

(54) INSULATING NOZZLE FOR GAS BLAST CIRCUIT BREAKER

(75) Inventor: Jean-Luc Bessede, Chateauvillain (FR)

(73) Assignee: Alstom, Paris (FR)

( * ) Notice: Subject to any disclaimer, the term of this patent is extended or adjusted under 35 U.S.C. 154(b) by 231 days.

(21) Appl. No.: 10/398,755

(22) PCT Filed: Oct. 19, 2001

(86) PCT No.: PCT/FR01/03263

§ 371 (c)(1),
(2), (4) Date: Aug. 13, 2003

(87) PCT Pub. No.: WO02/35567

PCT Pub. Date: May 2, 2002

(65) Prior Publication Data

US 2004/0014868 A1 Jan. 22, 2004

(30) Foreign Application Priority Data

Oct. 23, 2000 (FR) .................................. 00 13559

(51) Int. Cl.
*C08K 3/34* (2006.01)

(52) U.S. Cl. ........................ 524/492; 218/85; 239/589; 239/592; 239/596; 239/597; 239/600; 239/601; 239/602; 524/430; 524/432

(58) Field of Classification Search ................ 524/430, 524/432, 492; 218/85; 239/589, 592, 596, 239/597, 600, 601, 602
See application file for complete search history.

(56) References Cited

U.S. PATENT DOCUMENTS 4,562,322 A * 12/1985 Yamaguchi et al. .......... 218/85
5,828,026 A 10/1998 Bruehl et al.

FOREIGN PATENT DOCUMENTS

FR 2 346 823 A 10/1977

* cited by examiner

*Primary Examiner*—Edward J. Cain
(74) *Attorney, Agent, or Firm*—Sughrue Mion, PLLC

(57) ABSTRACT

The invention concerns an insulating nozzle for a gas blast circuit breaker. In accordance with the invention, the material constituting the nozzle comprises (A) 90% to 99.9% by weight of a fluorinated polymer, and (B) 0.1% to 10% by weight of a filler based on at least one oxide selected from (B1) $SiO_2$ and other oxidized forms of metals from column IVA of the periodic table, and (B2) ZnO, CdO and other oxidized forms of metals from column IIB of the periodic table.

9 Claims, No Drawings

INSULATING NOZZLE FOR GAS BLAST CIRCUIT BREAKER

The present invention relates to medium or high voltage gas blast circuit breakers using an insulating gas. More particularly, the invention relates to insulating nozzles for such circuit breakers.

A gas blast circuit breaker uses an insulating dielectric gas such as sodium hexafluoride to extinguish the electric arc. The interrupter chamber of such circuit breakers comprises an insulating nozzle that channels the gas and increases the pressure of the insulating gas in the vicinity of the electric arc, encouraging extinction of the electric arc. With repeated use, the nozzle becomes worn by mechanical abrasion resulting from the gas stream passing over the nozzle surface. The nozzle is also worn by pyrolysis resulting from an interaction between the radiation from the electric arc and the nozzle material.

Recently, nozzle wear has been exploited to facilitate electric arc extinction. The material lost by the nozzle on mechanical abrasion or wear due to pyrolysis produces an insulating gas when in contact with the electric arc. This increases the pressure in the vicinity of the arc and encourages arc extinction.

However, if the wear in the nozzle is too great, the service life of the circuit breaker is adversely affected. With a material that generates a great deal of gas, pressure increase and arc extinction during the initial interruptions are improved, but then the ability of the circuit breaker to interrupt low currents after having interrupted high short-circuit currents is reduced.

In contrast, if the material does not wear enough, the quantity of material lost by erosion, and therefore the quantity of insulating gas, is reduced, reducing the gas blast pressure and the arc extinction performance.

Further, if the choice of nozzle material is unsuitable, incomplete pyrolysis of the material may cause conductive particles to be deposited in the interrupter chamber, resulting in a degradation of the dielectric properties of the chamber.

Many solutions have been proposed to provide materials producing an insulating gas in a large quantity to encourage arc extinction, while avoiding deposition of conductive products on the nozzle surface and premature wear of the nozzle (see "*Mass Spectroscopy Study of the Influence of Nozzle Material on High-Pressure SF6 Arcs*", Meier R. et al., Applied Physics B, 1989).

The following have been proposed:

- a material formed from a mixture of a fluoroplastic monomer and boron nitride (U.S. Pat. No. 4,791,256);
- a material that filters electromagnetic radiation, containing a mixture of $Al_2O_3$, $TiO_2$, carbon and $CaF_2$ (Swiss patent CH-A-596 641);
- a material that is stabilized as regards the action of electric arcs, containing a mixture of CoO, $Al_2O_3$ and $CrAlO_3$ (European patent EP-A-0 673 965).

However, while some of the properties of those materials are improved, other equally important properties are adversely affected. Those materials, therefore, do not exhibit the desired optimum properties.

The invention aims to provide an insulating nozzle for a circuit breaker with a combination of advantageous properties from the point of view of the efficiency of the circuit breaker and its service life.

The invention provides an insulating nozzle for a gas blast circuit breaker, characterized in that the material constituting the nozzle comprises (A) 90% to 99.9% by weight of a fluorinated polymer, and (B) 0.1% to 10% by weight of a filler based on at least one oxide selected from (B1) $SiO_2$ and other oxidized forms of metals from column IVA of the periodic table, and (B2) ZnO, CdO and other oxidized forms of metals from column IIB of the periodic table.

In one embodiment, the material constituting the nozzle comprises 99% to 99.5% by weight of polymer (A) and 0.5% to 1% by weight of filler (B). In a further embodiment, the material comprises 99.4% by weight of polymer (A) and 0.6% by weight of filler (B).

In a still further embodiment, the material constituting the nozzle comprises 92% to 99% by weight of polymer (A) and 1% to 8% by weight of filler (B). In a yet still further embodiment, the material comprises 98% of polymer (A) and 2% by weight of filler (B).

Advantageously, the grain size of filler (B) is less than 50 micrometers (μm).

Preferably, the grain size is less than 1 μm.

The advantages and properties of the invention are made clear in the following description, which includes a series of examples.

Comparative tests were carried out on nozzles of the invention and on prior art nozzles.

The nozzles were produced using known procedures. A test composition mixture was produced by intimately mixing powdered fluoropolymer and powdered filler. A blank was then formed from this composition.

For PTFE, the blank was produced by isostatic pressing followed by oven curing. The final form of the nozzle was then produced by machining the blank.

For the other fluoropolymers (thermoplastics), the final nozzle was directly obtained by injecting molten mixture into a mold.

Two series of tests were carried out. The first series of tests used a puffer circuit breaker mock-up comprising a chamber filled with $SF_6$ insulating gas in which a cylindrical nozzle formed from the material to be tested had been placed along with the contacts engaged in the nozzle either side thereof. The nozzle diameter was of the order of 20 millimeters (mm) and its thickness was of the order of 10 mm. An arc was established between the contacts and its extinction was observed. The following measurements were made:

- The average number of zero currents prior to arc extinction (ZER), this number being optimal if equal to 1.
- The increase in the internal diameter of the nozzle after 5 extinctions, averaged over 10 tests. This increase (AUG) reflected nozzle erosion.
- The maximum pressure (PMAX1) reached in the chamber on the first extinction. This parameter corresponded to the production of insulating gas from the nozzle material.
- The maximum pressure (PMAX5) reached in the chamber at the fifth extinction was also measured to check whether the capacity of the material to produce insulating gas had been retained after a plurality of extinctions.

A second series of tests was carried out with an industrial medium voltage puffer type circuit breaker. The following measurements were made:

- As for the first series of tests, the increase in the diameter of the nozzle (USOCOL) after 5 extinctions was measured, taking an average over 10 tests.
- The wear in the nozzle was also measured by determining the loss in volume (USUVOL) of the nozzle after 5 extinctions, taking an average over 10 tests.

Finally, the contact wear (USUCONT) was measured by determining the loss of volume undergone by the contacts after 5 extinctions. This parameter characterized the influence of the material of the nozzle on the condition of the contacts.

EXAMPLE 1

The mixture was composed of polytetrafluoroethylene (PTFE) and 0.6% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.8 | 20.2 | 18.0 | 10.4 | 3.45 | 9.40 | 3.94 |

EXAMPLE 2

The mixture was composed of modified PTFE known as TFM (registered trademark of Dyneon) and 0.6% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.4 | 18.0 | 18.4 | 9.3 | 6.67 | 16.9 | 3.94 |

EXAMPLE 3

The mixture was composed of PTFE and 2% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.2 | 23.1 | 18.8 | 10.3 | 6 | 13.8 | 5.4 |

EXAMPLE 4

The mixture was composed of TFM polymer and 0.6% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.2 | 24.2 | 17.0 | 8.9 | 12.5 | 18.0 | 4.1 |

EXAMPLE 5

The mixture was composed of TFM polymer and 0.6% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.2 | 26.8 | 17.4 | 9.4 | 15.4 | 20.0 | 4.5 |

EXAMPLE 6

The mixture was composed of PTFE and 0.6% by weight of ZnO. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.2 | 22.7 | 15.7 | 9.4 | 16.5 | 22.7 | 4.9 |

EXAMPLE 7

The mixture was composed of PTFE and 5% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.0 | 20 | 20.8 | — | — | — | — |

EXAMPLE 8

The mixture was composed of TFM polymer and 5% by weight of $SiO_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.0 | 21.3 | 22.1 | — | — | — | — |

The mixtures of Examples 1–8 were in accordance with the invention. The overall properties of the nozzles produced from these mixtures was satisfactory.

For comparison purposes, the same tests were carried out using the materials described in Examples 9–13 below to produce nozzles from conventional mixtures.

EXAMPLE 9

The composition contained only TFM polymer. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 3.0 | 22.8 | 19.4 | 10.6 | 4.95 | 17.9 | 4.76 |

EXAMPLE 10

The mixture was composed of PTFE and 20% by weight of $CaF_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 4.0 | 19.5 | 17.1 | No result | 9.3 | 16.3 | 4.85 |

EXAMPLE 11

The mixture was composed of PTFE. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.2 | 16.2 | 15.7 | 9.6 | 6.7 | 16.6 | 4.5 |

EXAMPLE 12

The mixture was composed of PTFE and 0.3% by weight of $MOS_2$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 3.2 | 23.5 | 12.8 | 7.8 | 7.9 | 15.1 | 4.4 |

EXAMPLE 13

The mixture was composed of PTFE and 0.6% by weight of $Al_2CoO_4$. The test results were as follows:

| ZER | AUG (%) | PMAX1 (bars) | PMAX5 (bars) | USUCOL (mm) | USUVOL (mm) | USUCONT (mm) |
|---|---|---|---|---|---|---|
| 2.6 | 21.9 | 13.3 | 8.1 | 15.4 | 20.0 | 4.4 |

The results of Examples 9–13 were occasionally better as regards certain properties than those of Examples 1–8 in accordance with the invention, but they were defective as regards other properties. As emphasized above, the results of Examples 1–8 in accordance with the invention have the advantage as regards the analyzed properties taken as a set.

The invention claimed is:

1. An insulating nozzle for a gas blast circuit breaker, wherein, at every point throughout the nozzle, the material constituting the nozzle comprises (A) 90% to 99.9% by weight of a fluorinated polymer, and (B) 0.1% to 10% by weight of a filler based on at least one oxide selected from (B1) $SiO_2$ and other oxidized forms of metals from column IVA of the periodic table, and (B2) ZnO, CdO and other oxidized forms of metals from column IIB of the periodic table.

2. An insulating nozzle according to claim 1, wherein at every point throughout the nozzle, the material constituting the nozzle comprises 92% to 99% by weight of polymer (A) and 1% to 8% by weight of filler (B).

3. An insulating nozzle according to claim 2, wherein, at every point throughout the nozzle, the material constituting the nozzle comprises 98% of polymer (A) and 2% by weight of filler (B).

4. An insulating nozzle according to claim 1, wherein, at every point throughout the nozzle, the material constituting the nozzle comprises 99% to 99.5% by weight of polymer (A) and 0.5% to 1% by weight of filler (B).

5. An insulating nozzle according to claim 4, wherein, at every point throughout the nozzle, the material constituting the nozzle comprises about 99.4% by weight of polymer (A) and about 0.6% by weight of filler (B).

6. An insulating nozzle according to claim 1, wherein polymer (A) is PTFE or modified PTFE.

7. An insulating nozzle according to claim 1, wherein the grain size of the filler is less than 50 μm.

8. An insulating nozzle for a gas blast circuit breaker, wherein at every point throughout the nozzle, the material constituting the nozzle comprises (A) 90% to 99.9% by weight of a fluorinated polymer, and (B) 0.1% to 10% by weight of a filler based on at least one oxide selected from (B1) $SiO_2$ and other oxidized forms of metals from column IVA of the periodic table, and (B2) ZnO, CdO and other oxidized forms of metals from column IIB of the periodic table, and wherein the grain size of the filler is less than 1 μm.

9. An insulating nozzle for a gas blast circuit breaker, wherein at every point throughout the nozzle, the material constituting the nozzle consists of (A) 90% to 99.9% by weight of a fluorinated polymer, and (B) 0.1% to 10% by weight of a filler based on at least one oxide selected from (B1) $SiO_2$ and other oxidized forms of metals from column IVA of the periodic table, and (B2) ZnO, CdO and other oxidized forms of metals from column IIB of the periodic table.

* * * * *